United States Patent
Kim et al.

(10) Patent No.: US 7,671,632 B2
(45) Date of Patent: Mar. 2, 2010

(54) TRANSMISSION SYSTEM AND METHOD

(75) Inventors: Jong-hoon Kim, Hwaseong-si (KR);
Young-chan Jang, Yongin-si (KR);
Jae-jun Lee, Seongnam-si (KR);
Kwang-soo Park, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 478 days.

(21) Appl. No.: 11/645,605

(22) Filed: Dec. 27, 2006

(65) Prior Publication Data

US 2007/0146175 A1 Jun. 28, 2007

(30) Foreign Application Priority Data

Dec. 28, 2005 (KR) .................... 10-2005-0131887

(51) Int. Cl.
*H03K 19/094* (2006.01)
*H03K 19/0175* (2006.01)

(52) U.S. Cl. .................. 326/86; 326/59; 326/60; 326/90

(58) Field of Classification Search .......... 326/59–60, 326/86, 90
See application file for complete search history.

(56) References Cited

U.S. PATENT DOCUMENTS 6,317,465 B1 * 11/2001 Akamatsu et al. .......... 375/257
7,508,881 B2 * 3/2009 Choi et al. .................. 375/288

FOREIGN PATENT DOCUMENTS

| JP | 11-231984 | 8/1999 |
|---|---|---|
| JP | 11-234348 | 8/1999 |
| KR | 1020040087351 A | 10/2004 |
| KR | 1020040087351 A | 10/2004 |

OTHER PUBLICATIONS

Korean Office Action dated Mar. 21, 2007.

* cited by examiner

*Primary Examiner*—Anh Q Tran
(74) *Attorney, Agent, or Firm*—Harness, Dickey & Pierce, P.L.C.

(57) ABSTRACT

A transmission system and method may be provided. The transmission system may transmit 2-bit data for each transmission line set and each transmission line set may include first, second and/or third transmission lines arranged in order. The first, second and/or third transmission lines may respectively transmit first, second and/or third signals each having one of first, second and/or third values such that a combination of a first electric field between the first and second transmission lines and a second electric field between the second and third transmission lines may be made depending on a logic state of the 2-bit data. The transmission system may transmit differential signals using a smaller number of transmission lines and the transmission system may transmit a larger number of signals in the same circuit area.

19 Claims, 5 Drawing Sheets

TRANSMISSION SYSTEM AND METHOD

PRIORITY STATEMENT

This application claims the benefit of priority to Korean Patent Application No. 10-2005-0131887, filed on Dec. 28, 2005, in the Korean Intellectual Property Office, the entire contents of which is incorporated herein in its entirety by reference.

BACKGROUND

1. Field

Example embodiments relate to a signal transmission system and method, and for example, to a system and method for transmitting a differential signal using a field direction caused by a voltage or current difference between transmission lines.

2. Description of Related Art

Information may be transmitted and received between internal circuit blocks or logic blocks of a semiconductor system. The information communication may be carried out by simultaneously transmitting a plurality of data or bits. Transmitting the plurality of data or bits may require a plurality of transmission lines. Systems for transmitting the plurality of data or bits using the plurality of transmission lines may include a single transmission system and/or a differential transmission system.

FIG. 1A illustrates a transmission line structure 100 of the conventional single transmission system and FIG. 1B is an example circuit diagram of a driving circuit of the conventional single transmission system. Referring to FIG. 1A, the conventional single transmission system may transmit a single data bit using a single transmission line 110. For example, two transmission lines may be needed to transmit 2-bit data. The transmission line structure may include a ground line 130 under the transmission line 110. As shown in FIG. 1B, the driving circuit of the conventional single transmission system may use an inverter.

As the performance of a semiconductor system is improved, higher frequency signals may be transmitted between circuit blocks. However, the conventional single transmission system may have relatively poorer higher frequency signal transmission property. Accordingly, the conventional differential transmission system having relatively better higher frequency signal transmission property may be widely used to transmit higher frequency signals.

FIG. 2A illustrates a transmission line structure 200 of the conventional differential transmission system, and FIG. 2B is an example circuit diagram of a driving circuit of the conventional differential transmission system. Referring to FIG. 2A, the conventional differential transmission system may transmit a single data bit using two transmission lines 211 and 213. For example, 2-bit data may be transmitted using four transmission lines. The transmission line structure 200 may further include a ground line 230 under the transmission lines 211 and 213. The driving circuit of the conventional differential transmission system may use a differential amplifier, as shown in FIG. 2B.

Although the conventional differential transmission system may have relatively better higher frequency signal transmission characteristic, the conventional differential transmission system may use twice as many transmission lines as the number of transmitted signals and the conventional transmission system may require a larger area for the transmission lines. Accordingly, a transmission system that may occupy a relatively smaller area while having relatively better higher frequency signal transmission characteristic, for example, a transmission system capable of transmitting differential signals using a smaller number of transmission lines, may be required. A system of transmitting two signals using three transmission lines while using the differential transmission method would, for example, allow a larger number of differential signals having relatively better higher frequency signal characteristic to be transmitted in the same area.

SUMMARY

Example embodiments may provide a system for transmitting a differential signal using a field direction caused by a voltage or current difference between transmission lines.

Example embodiments may provide a method for transmitting a differential signal using a field direction caused by a voltage or current difference between transmission lines.

According to an example embodiment, there may be a transmission system transmitting 2-bit data and the transmission system may include first, second and/or third transmission lines arranged in order. The first, second and/or third transmission lines respectively transmit first, second and/or third voltage signals each having one of first, second and/or third voltages such that a combination of a first electric field between the first and second transmission lines and a second electric field between the second and third transmission lines may be made depending on the logic state of the 2-bit data.

According to an example embodiment, a transmission system may include at least one transmission line set each transmitting 2-bit data of a plurality of bits, wherein each transmission line set may include first, second and/or third transmission lines arranged in order, the first, second, and/or third transmission lines respectively transmitting first, second, and/or third signals each having one of first, second, and/or third values such that a combination of a first electric field between the first and second transmission lines and a second electric field between the second and third transmission lines may be made depending on a logic state of the 2-bit data.

According to an example embodiment, the first, second and/or third signals may be first, second and/or third voltage signals each having one of first, second, and/or third voltages.

According to an example embodiment, the first, second and/or third signals may be first, second and/or third current signals each having one of first, second, and/or third current quantities.

According to an example embodiment the 2-bit data may have first, second, third and/or fourth logic states. The first electric field may be in a direction from the first transmission line toward the second transmission line and the second electric field may be in a direction from the second transmission line toward the third transmission line in the first logic state. The first electric field may be in the direction from the first transmission line toward the second transmission line and the second electric field may be in a direction from the third transmission line toward the second transmission line in the second logic state. The first electric field may be in a direction from the second transmission line toward the first transmission line and the second electric field may be in the direction from the second transmission line toward the third transmission line in the third logic state. The first electric field may be in the direction from the second transmission line toward the first transmission line and the second electric field may be in the direction from the third transmission line toward the second transmission line in the fourth logic state.

According to an example embodiment the first, second and/or third voltage signals respectively may have the first, second and third voltages in the first logic state. The first, second and/or third voltage signals respectively may have the first, third and first voltages in the second logic state. The first, second and/or third voltage signals respectively may have the third, first and third voltages in the third logic state. The first, second and/or third voltage signals respectively may have the third, second and first voltages in the fourth logic state.

According to an example embodiment, the transmission system may further include a driver for each transmission line set and/or a receiver for each transmission line set. The driver may generate the first, second and/or third voltage signals in response to the 2-bit data and/or respectively transmits the first, second and/or third voltage signals to the first, second and/or third transmission lines. The receiver may receive the first, second and/or third voltage signals respectively transmitted through the first, second and/or third transmission lines to generate generated 2-bit data.

According to an example embodiment, each driver may include first and/or second differential amplifiers. The first differential amplifier may differential-amplify one bit of the 2-bit data and/or a desired or predetermined reference voltage. The second differential amplifier may differential-amplify another bit of the 2-bit data and/or the reference voltage. The first voltage signal may correspond to a first output of the first differential amplifier, a second output of the first differential amplifier and a first output of the second differential amplifier may be combined and distributed to a desired or predetermined voltage to become the second voltage signal, and the third voltage signal may correspond to a second output of the second differential amplifier.

According to an example embodiment, each receiver may include third and/or fourth differential amplifiers. The third differential amplifier may receive the first and second voltage signals and/or differential-amplify the received first and second voltage signals. The fourth differential amplifier may receive the second and third voltage signals and/or differential-amplify the received second and third voltage signals. An input terminal of the third differential amplifier and an input terminal of the fourth differential amplifier, which may receive the second voltage signal, may be connected to each other, one bit of the generated 2-bit data may correspond to an output of the third differential amplifier, and/or another bit of the generated 2-bit data may correspond to an output of the fourth differential amplifier.

According to an example embodiment, the receiver may include a fifth differential amplifier, a sixth differential amplifier and/or a reference voltage setting unit. The fifth differential amplifier may receive the first and second voltage signals and/or differential-amplify the received first and/or second voltage signals. The sixth differential amplifier may receive the second and third voltage signals and/or differential-amplify the received second and/or third voltage signals. The reference voltage setting unit may set a second output of the fifth differential amplifier and/or a first output of the sixth differential amplifier to a desired predetermined reference voltage. One bit of the generated 2-bit data may correspond to a first output of the fifth differential amplifier and/or another bit of the generated 2-bit data may correspond to a second output of the sixth differential amplifier.

According to an example embodiment, the reference voltage setting unit may include first, second, third and/or fourth resistors. The first resistor may have a first terminal connected to a first voltage. The second resistor may have a first terminal connected to a second terminal of the first resistor and/or a second terminal connected to a second voltage. The third resistor may have a first terminal connected to the second terminal of the first resistor and/or a second terminal connected to the second output of the fifth differential amplifier.

The fourth resistor may have a first terminal connected to the second terminal of the first resistor and a second terminal connected to the first output of the sixth differential amplifier.

According to an example embodiment, the transmission system may further include first and/or second inverters for each transmission line set. The first inverter may invert the first, second and/or third voltage signals generated by the driver and respectively may transmit the inverted first, second and/or third voltage signals to the first, second and/or third transmission lines. The second inverter may receive the inverted first, second and/or third voltage signals transmitted through the first, second and/or third transmission lines, may invert the received inverted first, second and/or third voltage signals, and/or may output the twice inverted first, second and/or third voltage signals to the receiver.

According to an example embodiment, the data transmitted through the first, second and/or third transmission lines may be double differential signals.

According to an example embodiment, there may be a transmission system transmitting 2-bit data and the transmission system may include first, second and/or third transmission lines arranged in order. The first, second and/or third transmission lines respectively may transmit first, second and/or third current signals each having one of first, second and/or third current quantities such that a combination of a first electric field between the first and second transmission lines and a second electric field between the second and third transmission lines may be made depending on a logic state of the 2-bit data.

According to an example embodiment, there may be a transmission system transmitting data having a plurality of bits using a plurality of transmission line set each transmitting 2-bit data. Each of the transmission line set may include first, second and/or third transmission lines arranged in order. The first, second and/or third transmission lines respectively transmitting first, second and/or third voltage signals each having one of first, second and/or third voltages such that a combination of a first electric field between the first and second transmission lines and a second electric field between the second and third transmission lines may be made depending on a logic state of the 2-bit data.

According to an example embodiment, a method for transmitting 2-bit data in a transmission system that may include first, second and/or third transmission lines arranged in order may include generating first, second and/or third voltage signals each having one of first, second and/or third voltages such that a combination of a first electric field between the first and second transmission lines and a second electric field between the second and third transmission lines may be made depending on the logic state of the 2-bit data; respectively transmitting the first, second and/or third voltage signals to the first, second and/or third transmission lines; and receiving the first, second and/or third voltage signals transmitted through the first, second and/or third transmission lines to generate 2-bit data.

According to an example embodiment, a method for transmitting data of a plurality of bits in a transmission system including a transmission line set for each 2-bit data of the plurality of bits, each transmission line set including first, second and/or third transmission lines arranged in order, may include generating for each transmission line set first, second and/or third signals each having one of first, second and/or third values such that a combination of a first electric field between the first and second transmission lines and a second electric field between the second and third transmission lines may be made depending on a logic state of the 2-bit data, respectively transmitting for each transmission line set the first, second and/or third signals to the first, second and/or third transmission lines, and/or receiving for each transmission line set the first, second and/or third signals transmitted through the first, second and/or third transmission lines to generate generated 2-bit data.

According to an example embodiment, the first, second and/or third signals may be first, second and/or third voltage signals each having one of first, second and/or third voltages.

According to an example embodiment, the first, second and/or third signals may be first, second and/or third current signals each having one of first, second, and/or third current quantities.

According to an example embodiment, the 2-bit data may have first, second, third and/or fourth logic states. The first electric field may be in a direction from the first transmission line toward the second transmission line and the second electric field may be in a direction from the second transmission line toward the third transmission line in the first logic state. The first electric field may be in the direction from the first transmission line toward the second transmission line and the second electric field may be in a direction from the third transmission line toward the second transmission line in the second logic state. The first electric field may be in a direction from the second transmission line toward the first transmission line and the second electric field may be in the direction from the second transmission line toward the third transmission line in the third logic state. The first electric field may be in the direction from the second transmission line toward the first transmission line and the second electric field may be in the direction from the third transmission line toward the second transmission line in the fourth logic state.

According to an example embodiment, the first, second and/or third voltage signals may respectively have the first, second and third voltages in the first logic state. The first, second and/or third voltage signals may respectively have the first, third and first voltages in the second logic state. The first, second and/or third voltage signals may respectively have the third, first and third voltages in the third logic state. The first, second and/or third voltage signals may respectively have the third, second and first voltages in the fourth logic state.

According to an example embodiment, the transmitting of the first, second and/or third voltage signals may include inverting the first, second and/or third voltage signals and/or respectively transmitting the inverted the first, second and/or third voltage signals to the first, second and/or third transmission lines; and/or receiving the inverted first, second and/or third voltage signals respectively transmitted through the first, second and/or third transmission lines, inverting the received inverted first, second and/or third voltage signals and outputting the twice inverted first, second and/or third voltage signals.

According to an example embodiment, the data transmitted through the first, second and/or third transmission lines may be double differential signals.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1A:
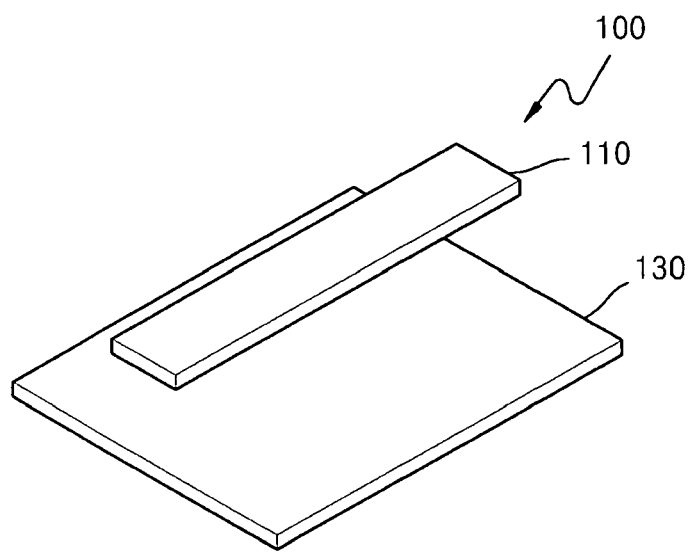
FIG. 1A illustrates a transmission line structure of a conventional single transmission system.
Figure 1B:
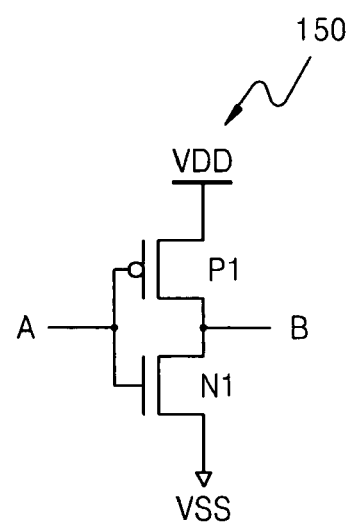
FIG. 1B illustrates an example circuit diagram of a driving circuit of a conventional single transmission system.
Figure 2A:
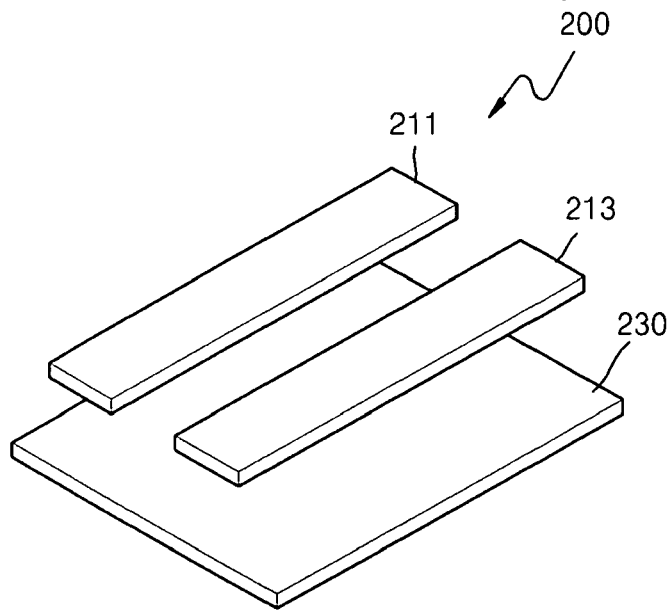
FIG. 2A illustrates a transmission line structure of a conventional differential transmission system.
Figure 2B:
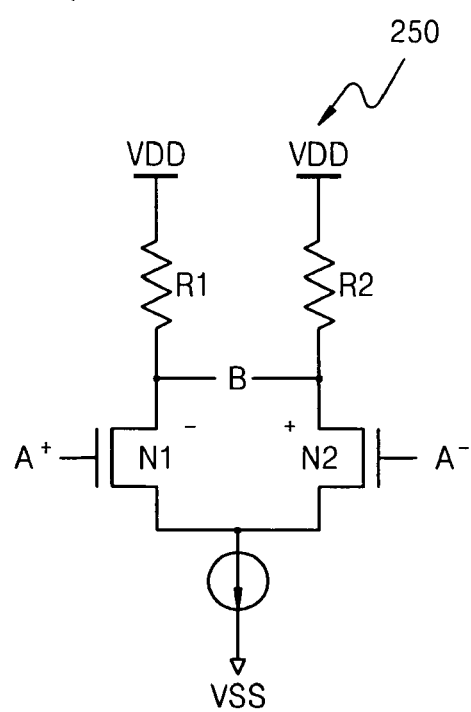
FIG. 2B illustrates an example circuit diagram of a driving circuit of a conventional differential transmission system

Example embodiments will now be described more fully with reference to the accompanying drawings. Embodiments may, however, be embodied in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

Figure 3A:
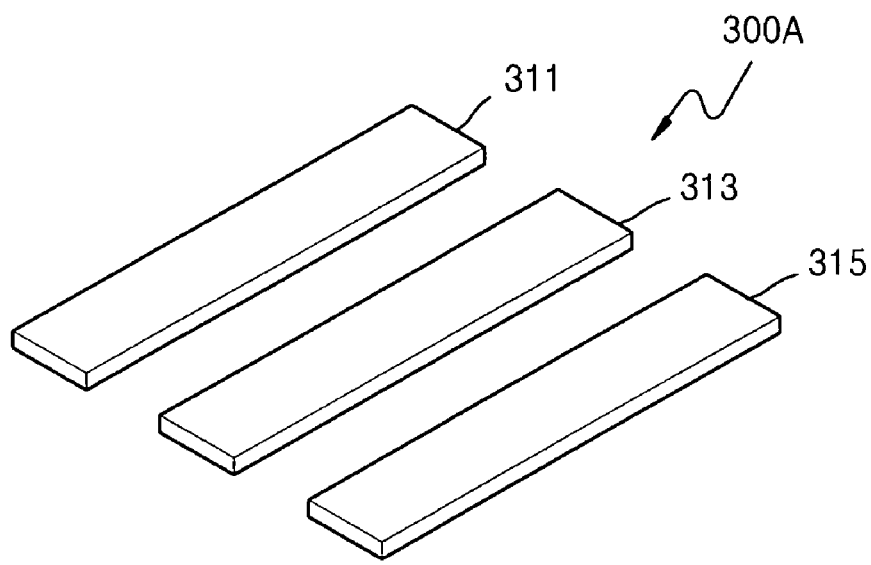
FIGS. 3A and 3B illustrate a transmission line structure used in a double differential transmission system according to an example embodiment.
Figure 3B:
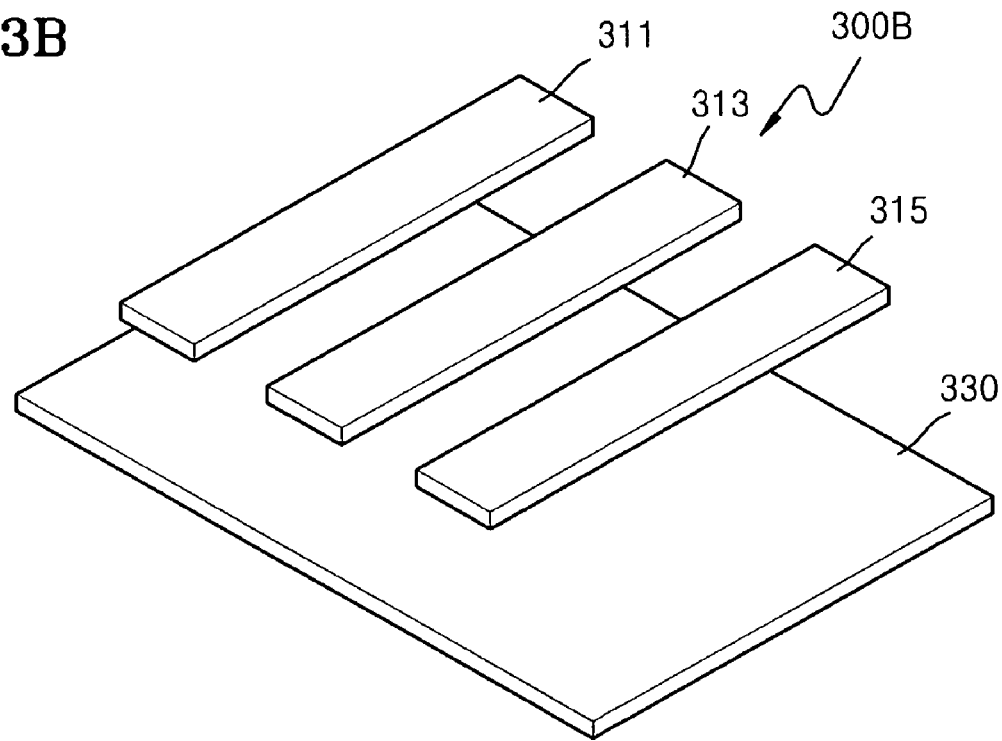

FIGS. 3A and 3B illustrate transmission line structures 300A and 300B used in a double differential transmission system according to an example embodiment. The transmission line structure 300A shown in FIG. 3A has no ground line while the transmission line structure 300B shown in FIG. 3B may include a ground line 330.

The transmission line structure 300A may include first, second and/or third transmission lines 311, 313 and/or 315 arranged in order. The transmission line structure 300B may include the ground line 330 in addition to the first, second and/or third transmission lines 311, 313 and 315. The ground line 330 may provide a ground voltage and/or may protect the first, second and/or third transmission lines 311, 313 and/or 315. The transmission line structure 300A and the transmission line structure 300B may execute the same function of transmitting signals through the first, second and/or third transmission lines 311, 313 and/or 315. The operation of transmitting signals through the first, second and/or third transmission lines 311, 313 and/or 315 will now be explained.

The transmission line structure 300A or 300B according to an example embodiment may transmit 2-bit data, for example, double differential data, through the first, second and/or third transmission lines 311, 313 and/or 315. Example embodiments may transmit the double differential data using a combination of electric field directions between neighboring transmission lines, which will be explained in more detail.

The first, second and/or third transmission lines 311, 313 and/or 315 may respectively transmit first, second and/or third voltage signals each having one of first, second and/or third voltages such that a combination of a first electric field between the first and second transmission lines and a second electric field between the second and third transmission lines may be made depending on the logic state of the 2-bit data. The 2-bit data may have four logic states of 00, 01, 10 and/or 11, which may be respectively defined as first, second, third and/or fourth states, for example.

There may be four combinations of field directions between transmission lines. When the electric field between the first and second transmission lines 311 and 313 is the first electric field and the electric field between the second and third transmission lines 313 and 315 is the second electric field, as described above, the four combinations of field directions may be as follows.

A first combination of field directions may be when the first electric field is in the direction from the first transmission line 311 toward the second transmission line 313 and the second electric field is in the direction from the second transmission line 313 toward the third transmission line 315.

A second combination of field directions may be when the first electric field is in the direction from the first transmission line 311 toward the second transmission line 313 and the second electric field is in the direction from the third transmission line 315 toward the second transmission line 313.

A third combination of field directions may be when the first electric field is in the direction from the second transmission line 313 toward the first transmission line 311 and the second electric field is in the direction from the second transmission line 313 toward the third transmission line 315.

A fourth combination of field directions may be when the first electric field is in the direction from the second transmission line 313 toward the first transmission line 311 and the second electric field is in the direction from the third transmission line 315 toward the second transmission line 313.

The first, second, third and/or fourth combinations of field directions may respectively correspond to the four states of the 2-bit data. For example, the first, second, third and/or fourth states may respectively correspond to the first, second, third and/or fourth combinations of field directions. However, those skilled in the art will understand that example embodiments are not limited thereto.

In order to obtain the combinations of field directions between the transmission lines, voltage signals having desired or predetermined voltages should be transmitted through the first, second and/or third transmission lines 311, 313 and/or 315. For example, first, second and/or third voltage signals may be respectively transmitted through the first, second, and/or third transmission lines 311, 313 and/or 315.

In an example embodiment, the first, second and/or third voltage signals may respectively have the first, second and third voltages in the first state, first, third and first voltages in the second state, third, first and third voltages in the third state, and/or third, second and first voltages in the fourth state.

In order to satisfy the four combinations of field directions, the first voltage may be higher than the second voltage and the second voltage may be higher than the third voltage. The first, second and/or third voltages may have the same sign (for example, (3, 2, 1) or (5, 3, 1)) or different signs (for example, (3, 1, −1) or (1, 0, −1)). In an example embodiment, the first and third voltages may be values having different signs but the same absolute value and the second voltage may be 0 (for example, 1, 0, −1).

Table 1 represents the relationship between the combinations of field directions between transmission lines, which may respectively correspond to the logic states of 2-bit data to be transmitted, and voltages of signals transmitted through the transmission lines, which may respectively correspond to the combinations.

TABLE 1

| State | T1 | Direction | T2 | Direction | T3 |
| --- | --- | --- | --- | --- | --- |
| 0 | High | → | 0 | → | Low |
| 1 | High | → | Low | ← | High |
| 2 | Low | ← | High | → | Low |
| 3 | Low | ← | 0 | ← | High |

In Table 1, state 0, state 1, state 2 and state 3 may respectively represent the first, second, third and/or fourth states of the 2-bit data, T1, T2 and T3 may respectively represent the voltages of the first, second and/or third voltage signals flowing through the first, second and/or third transmission lines 311, 313 and/or 315, and the direction may include the direction of the first electric field and/or the direction of the second electric field. The first, second and/or third voltages that the first, second and/or third voltage signals may have may be represented by High, 0 and/or Low.

Figure 4:
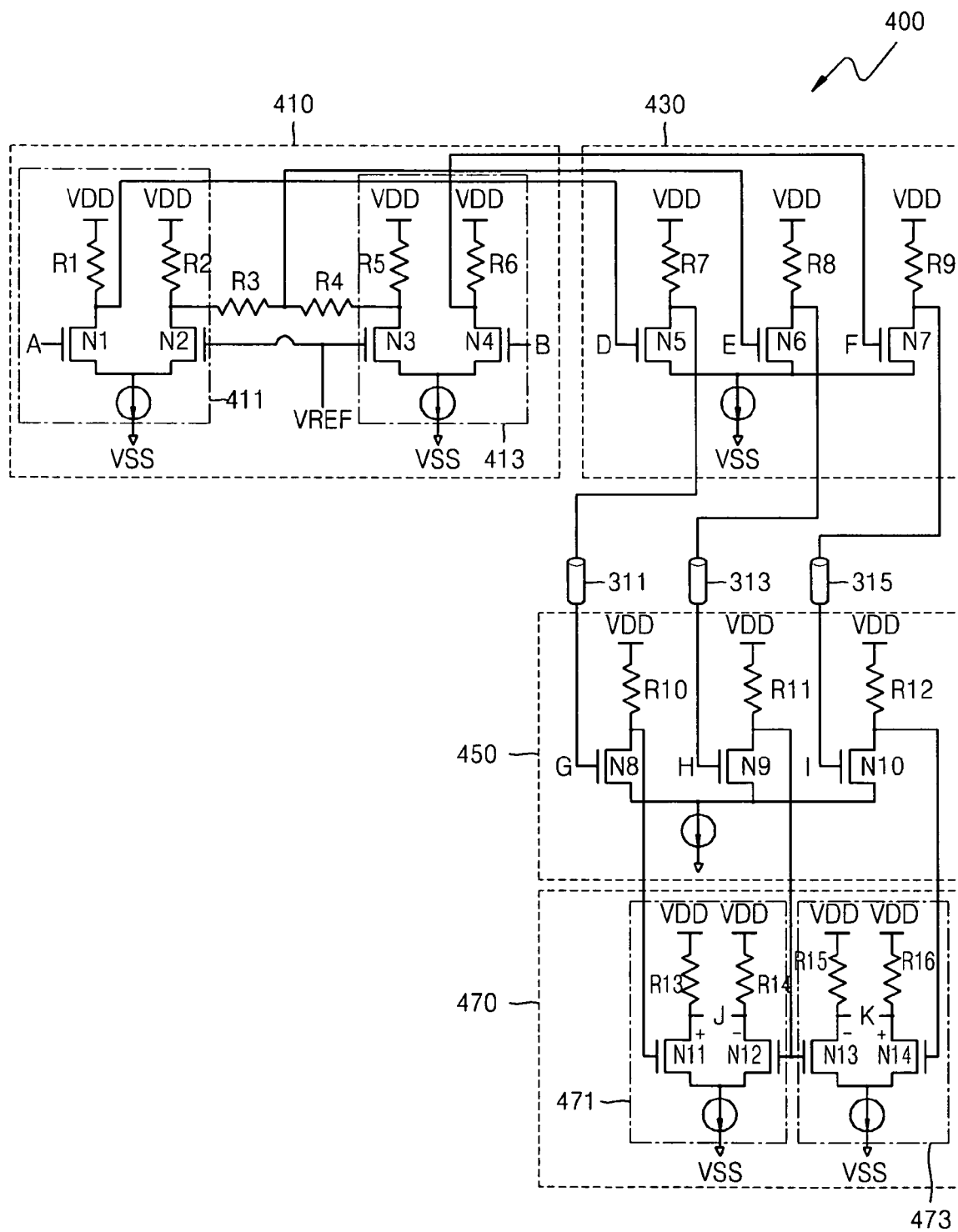
FIG. 4 is an example block diagram of a double differential transmission system according to an example embodiment.

FIG. 4 is a block diagram of a double differential transmission system 400 according to an example embodiment. The double differential transmission system 400 may use the transmission line structure 300A or 300B of FIG. 3 and/or the aforementioned method of transmitting double differential data using the transmission line structure 300A or 300B.

Referring to FIG. 4, the double differential transmission system 400 may include the first, second and/or third transmission lines 311, 313 and/or 315, a driver 410 and/or a receiver 470. The double differential transmission system 400 may further include first and/or second inverters 430 and/or 450. In the transmission system 400 transmitting 2-bit data, the driver 410 may drive the first, second and/or third transmission lines 311, 313 and 315 in response to the state of the 2-bit data. Accordingly, the driver 410 may be a double differential driver that may receive the 2-bit data and may drive the three transmission lines 311, 313 and/or 315.

In the transmission system 400, two differential signals may be transmitted through the first, second and/or third transmission lines 311, 313 and/or 315. Accordingly, the transmission lines may be double differential transmission lines.

The receiver 470 may generate 2-bit data using two differential signals received from the first, second and/or third transmission lines 311, 313 and/or 315, and the receiver 470 may be a double differential receiver. For example, the transmission system 400 may include the double differential driver, double differential transmission lines and/or double differential receiver.

The structure and operation of the double differential transmission system 400 will now be explained. In an example embodiment, 2-bit data 01, 00, 11 and/or 10 may respectively correspond to first, second, third and/or fourth states. However, those skilled in the art will understand that example embodiments are not limited thereto.

The driver 410 may generate the first, second and/or third voltage signals to be respectively transmitted through the first, second and/or third transmission lines 311, 313 and/or 315 in response to the state of the 2-bit data and/or may transmit the first, second and/or third voltage signals to the first, second and/or third transmission lines 311, 313 and/or 315.

Table 2 represents the voltages of the first, second and/or third voltage signals generated by the driver 410 in response to the state of the 2-bit data.

TABLE 2

| I1 | I2 | O1   | O2   | O3   | State |
|----|----|------|------|------|-------|
| L  | H  | High | 0    | Low  | 0     |
| L  | L  | High | Low  | High | 1     |
| H  | H  | Low  | High | Low  | 2     |
| H  | L  | Low  | 0    | High | 3     |

In Table 2, I1 and I2 may represent the input 2-bit data, and O1, O2 and O3 may respectively represent the voltages of the first, second and/or third voltage signals generated by the driver 410. For example, the driver 410 may generate the first, second and/or third voltage signals respectively having the first, second and third voltages in response to the first state of the 2-bit data (LH=01) and may transmit the first, second and/or third voltage signals to the first, second and/or third transmission lines 311, 313 and/or 315.

Furthermore, the driver 410 may generate the first, second and/or third voltage signals respectively having the first, third and first voltages in response to the second state of the 2-bit data (LL=00) and/or may transmit the first, second and/or third voltage signals to the first, second and/or third transmission lines 311, 313 and/or 315. The driver 410 may generate the first, second and/or third voltage signals respectively having the third, first and third voltages in response to the third state of the 2-bit data (HH=11) and/or may transmit the first, second and/or third voltage signals to the first, second and/or third transmission lines 311, 313 and/or 315. The driver 410 may generate the first, second and/or third voltage signals respectively having the third, second and first voltages in response to the fourth state of the 2-bit data (HL=10) and may transmit the first, second and/or third voltage signals to the first, second and/or third transmission lines 311, 313 and/or 315.

In order to generate the first, second and/or third voltage signals, the driver 410 may include first and/or second differential amplifiers 411 and/or 413. The first differential amplifier 411 may differential-amplify one bit A of the 2-bit data and/or a desired or predetermined reference voltage VREF. The second differential amplifier 413 may differential-amplify another bit B of the 2-bit data and/or the reference voltage VREF.

A first output amplified by the first differential amplifier 411 may be output as the first voltage signal D and/or a second output amplified by the second differential amplifier 413 may be output as the third voltage signal F. A second output amplified by the first differential amplifier 411 and a first output amplified by the second differential amplifier 413 may be coupled and distributed to a desired or predetermined voltage through resistors R3 and R4 to become the second voltage signal E. For example, the desired or predetermined voltage may make the second voltage signal E have a differential relationship with the first voltage signal D and/or the third voltage signal F. In this manner, the second output of the first differential amplifier 411 and the first output of the second differential amplifier 413 may be coupled and distributed to a desired or predetermined voltage to generate a double differential signal.

The receiver 470 may receive the first, second and/or third voltage signals D, E and/or F respectively transmitted through the first, second and/or third transmission lines 311, 313 and/or 315 to generate 2-bit data J and/or K. The received first, second and/or third voltage signals may have the same voltages as the first, second and/or third voltage signals D, E and/or F as long as the received first, second and/or third voltage signals may not be distorted while transmitted through the first, second and/or third transmission lines 311, 313 and/or 315. The 2-bit data J and/or K may be identical to the 2-bit data A and/or B.

Table 3 represents the 2-bit data generated by the receiver 470 in response to the voltages of the received first, second and/or third voltage signals.

TABLE 3

| State | I1   | I2   | I3   | O1 | O2 |
|-------|------|------|------|----|----|
| 3     | Low  | 0    | High | H  | L  |
| 2     | Low  | High | Low  | H  | H  |
| 1     | High | Low  | High | L  | L  |
| 0     | High | 0    | Low  | L  | H  |

In Table 3, I1, I2 and I3 may represent the voltages of the received first, second and/or third voltage signals and O1 and O2 may represent the 2-bit data generated by the receiver 470. For example, the receiver 470 may generate the 2-bit data (LH=01) in the first state in response to the received first, second and/or third voltage signals respectively having the first, second and third voltages and may generate the 2-bit data (LL=00) in the second state in response to the received first, second and/or third voltage signals respectively having the first, third and first voltages. The receiver 470 may generate the 2-bit data (HH=11) in the third state in response to the received first, second and/or third voltage signals respectively having the third, first and third voltages and may generate the 2-bit data (HL=10) in the fourth state in response to the received first, second and/or third voltage signals respectively having the third, second and first voltages.

To generate the 2-bit data J and/or K, the receiver 470 may include third and/or fourth differential amplifiers 471 and/or 473. The third differential amplifier 471 may differential-amplify the received first and/or second voltage signals. The fourth differential amplifier 473 may differential-amplify the received second and/or third voltage signals. Accordingly, a input terminal of the third differential amplifier 471 and a input terminal of the fourth differential amplifier 473, which may receive the second voltage signal, may be connected to each other, as shown in FIG. 4.

Because the received first and/or second voltage signals may have a differential relationship, the output amplified by the third differential amplifier 471 may have the value of one bit A of the input 2-bit data. Furthermore, the output amplified by the fourth differential amplifier 473 may have the value of another bit B of the input 2-bit data because the received second and/or third voltage signals have a differential relationship.

The transmission system 400 may further include the first and/or second inverters 430 and/or 450. Although the transmission system 400 may directly transmit the first, second and/or third voltage signals D, E and/or F generated by the driver 410 to the first, second and/or third transmission lines 311, 313 and/or 315, the transmission system 400 may invert the first, second and/or third voltage signals D, E and/or F, may transmit the inverted voltage signals through the transmission lines, may invert the transmitted voltage signals, and/or output the inverted signals to the receiver 470 to improve transmission efficiency.

The first inverter 430 may invert the first, second and/or third voltage signals D, E and/or F generated by the driver 410 and may respectively transmit the inverted signals to the first, second and/or third transmission lines 311, 313 and/or 325. The second inverter 450 may receive the inverted first, second and/or third voltage signals G, H and/or I transmitted through the first, second and/or third transmission lines 311, 313 and/or 315, may invert the received first, second and third voltage signals G, H and/or I and may output them to the receiver 470.

As described above, the first and/or second inverters 430 and/or 450 may be used to improve transmission efficiency of the transmission lines 311, 313 and/or 315. The first inverter 430 may invert the first, second and/or third voltage signals D, E and/or F generated by the driver 410 and/or may amplify the first, second and/or third voltage signals D, E and/or F to minimize the influence of noise in the transmission lines 311, 313 and/or 315 on the first, second and/or third voltage signals D, E and/or F. For example, the first inverter 430 may invert the first, second and/or third voltage signals D, E and/or F generated by the driver 410 and/or, simultaneously, may amplify the first, second and/or third voltage signals D, E and/or F to minimize the influence of noise in the transmission lines 311, 313 and/or 315 on the first, second and/or third voltage signals D, E and/or F. The second inverter 450 may invert the first, second and/or third voltage signals G, H and/or I received from the transmission lines 311, 313 and/or 315 and/or may amplify the first, second and/or third voltage signals that may have been weakened while transmitted through the transmission lines 311, 313 and/or 315 and may output the amplified voltage signals to the receiver 470. For example, the second inverter 450 may invert the first, second and/or third voltage signals G, H and/or I received from the transmission lines 311, 313 and/or 315 and/or, simultaneously, may amplify the first, second and/or third voltage signals that may have been weakened while transmitted through the transmission lines 311, 313 and/or 315 and may output the amplified voltage signals to the receiver 470.

Those skilled in the art may understand that the first and/or second inverters 430 and/or 450 may be configured in circuits for inverting input data other than the circuit shown in FIG. 4. For example, the first and/or second inverters 430 and/or 450 may have the same circuit configuration, as shown in FIG. 4, or different circuit configurations.

Table 4 represents the voltages of the voltage signals input to the first or second inverter 430 or 450 and the voltages of the voltage signals output from the first or second inverter 430 or 450.

TABLE 4

| State | I1 | I2 | I3 | O1 | O2 | O3 | State |
|---|---|---|---|---|---|---|---|
| 0 | High | 0 | Low | Low | 0 | High | 3 |
| 1 | High | Low | High | Low | High | Low | 2 |
| 2 | Low | High | Low | High | Low | High | 1 |
| 3 | Low | 0 | High | High | 0 | Low | 0 |

In Table 4, I1, I2 and I3 represent the voltages of the voltage signals input to the first or second inverter 430 or 450 and O1, O2 and O3 represent the voltages of the voltage signals output from the first or second inverter 430 or 450. Referring to Table 4, the second voltage may not be changed while the first voltage may be inverted to the third voltage. The first or second inverter 430 or 450 may respectively invert the first, second, third and/or fourth states to the fourth, third, second and/or first states.

Table 5 represents the voltages of the data and the voltage signals transmitted in the transmission system 400.

TABLE 5

| A | B | D | E | F | G | H | I | J | K |
|---|---|---|---|---|---|---|---|---|---|
| L | H | High | 0 | Low | Low | 0 | High | L | H |
| L | L | High | Low | High | Low | High | Low | L | L |
| H | H | Low | High | Low | High | Low | High | H | H |
| H | L | Low | 0 | High | High | 0 | Low | H | L |

Referring to Table 5, the 2-bit data A and/or B to be transmitted may be changed to the first, second and/or third voltage signals D, E and/or F by the driver 410, and/or the first, second and/or third voltage signals D, E and/or F may be inverted to the voltage signals G, H and/or I by the first inverter 430 and/or transmitted through the transmission lines 311, 313 and/or 315. The transmitted voltage signals may be received by the receiver 470 and restored to the 2-bit data J and/or K.

Figure 5:
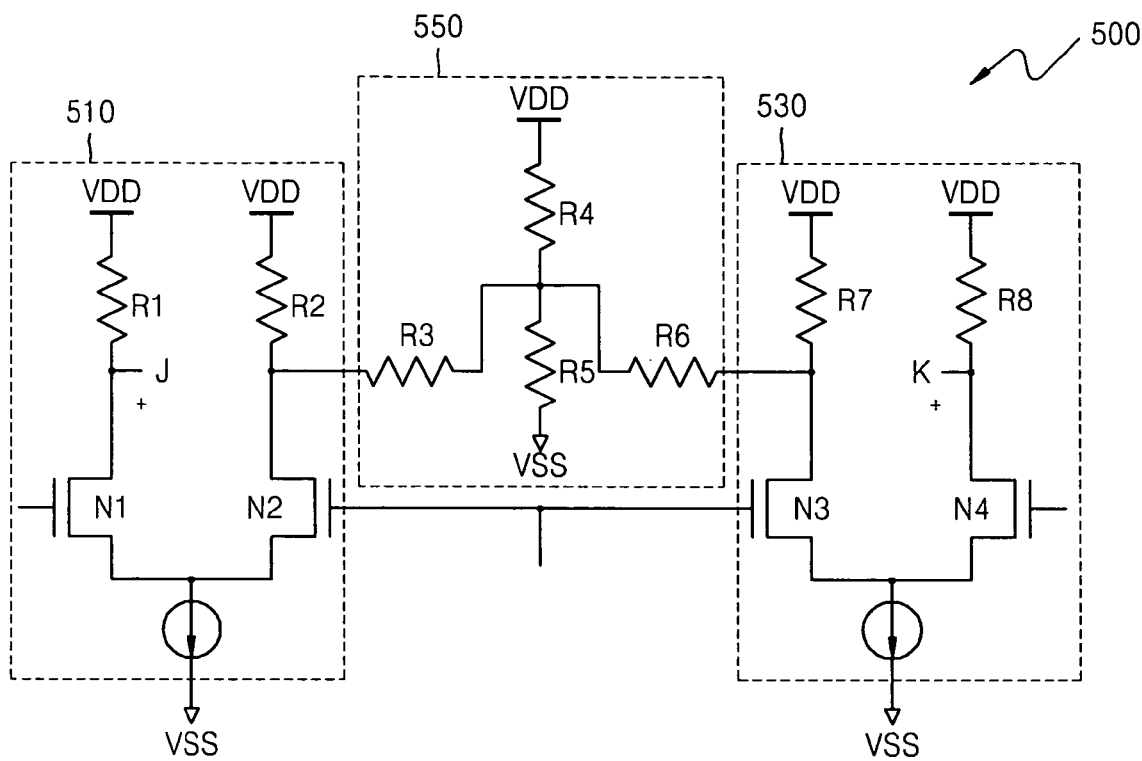
FIG. 5 is an example block diagram of a receiver that may replace a receiver of FIG. 4.

FIG. 5 is a block diagram of a receiver 500 that may replace the receiver 470 of FIG. 4. The receiver 500 may include a reference voltage setting unit 550 and/or fifth and/or sixth differential amplifiers 510 and/or 530. The structure and operation of the receiver 500 will now be explained with reference to FIGS. 4 and 5.

The operations of the fifth and/or sixth differential amplifiers 510 and/or 530 may be identical to the operations of the third and/or fourth differential amplifiers 471 and/or 473 of the receiver 470 of FIG. 4 except that a second output of the fifth differential amplifier 510 and/or a first output of the sixth differential amplifier 530 may be fixed to a desired or predetermined voltage set by the reference voltage setting unit 550. For example, one bit J of the 2-bit data generated by the receiver 500 may correspond to a first output of the fifth differential amplifier 510 and/or another bit K of the 2-bit data generated by the receiver 500 may correspond to a second output of the sixth differential amplifier 530. Accordingly, only the operation of the reference voltage setting unit 550 will be explained.

The reference voltage setting unit 550 may include first, second, third and/or fourth resistors R4, R5, R3 and/or R6. A first terminal of the first resistor R4 may be connected to a first voltage VDD. A first terminal of the second resistor R5 may be connected to a second terminal of the first resistor R4 and/or a second terminal of the second resistor R5 may be connected to a second voltage VSS. A first terminal of the third resistor R3 may be connected to the second terminal of the first resistor R4 and/or a second terminal of the third resistor R3 may be connected to the second output of the fifth differential amplifier 510. A first terminal of the fourth resistor R6 may be connected to the second terminal of the first resistor R4 and/or a second terminal of the fourth resistor R6 may be connected to the first output of the sixth differential amplifier 530. The first voltage VDD may be a power supply voltage and/or the second voltage VSS may be a ground voltage.

As described above, a desired or predetermined reference voltage may be set by the first, second, third and/or fourth resistors R4, R5, R3 and R6 of the reference voltage setting unit 550 such that the second output of the fifth differential amplifier 510 and/or the first output of the sixth differential amplifier may be fixed to the desired or predetermined reference voltage.

In an example embodiment, a method of transmitting double differential signals using combinations of field directions formed between transmission lines was explained. However, example embodiments may transmit the double differential signals using combinations of current quantities of current signals transmitted through transmission lines. For example, example embodiments may transmit 2-bit data using combinations of field directions corresponding to combinations of current quantities of current signals (for example, combinations of current directions) respectively transmitted through the first, second and/or third transmission lines 311, 313 and/or 315. For example, the first, second and/or third transmission lines 311, 313 and/or 315 may respectively transmit first, second and/or third current signals each having one of a first current quantity, a second current quantity (reference current quantity, for example) and/or a third current quantity.

For example, the first, second and/or third current signals may respectively have first, second and third current quantities in the first state of the 2-bit data and/or first, second and first current quantities in the second state of the 2-bit data. The first, second and/or third current signals may respectively have third, second and first current quantities in the third state of the 2-bit data and/or third, second and third current quantities in the fourth state of the 2-bit data.

For example, the first and third current quantities may have the same absolute value but opposite signs. The second current quantity may be 0 when the first and third current signals may have different directions and the second current quantity may be twice the current quantity of the first current signal when the first and third current signals have the same direction.

The transmission system for double-differential-transmitting 2-bit data may be extended to construct a system for double-differential-transmitting plural-bit data. The system for double-differential-transmitting plural-bit data may use a plurality of transmission line sets each transmitting 2-bit data. Each transmission line set may include first, second and/or third transmission lines arranged in order. The first, second and/or third transmission lines may respectively transmit first, second and/or third voltage signals each having one of first, second and/or third voltages such that a combination of a first electric field between the first and second transmission lines and a second electric field between the second and third transmission lines may be made depending on the logic state of the 2-bit data.

Figure 6A:
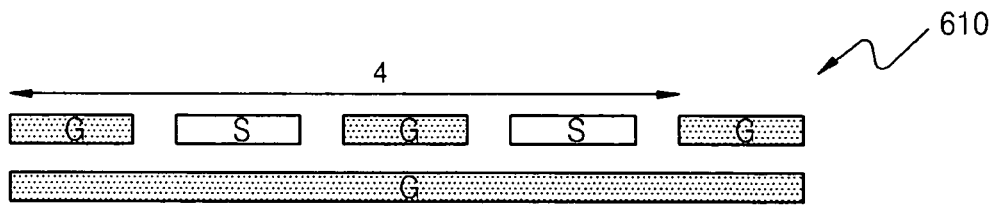
FIGS. 6A-6C illustrate transmission line structures of the single transmission system, differential transmission system and double differential transmission system according to an example embodiment when a guard line may be included in the transmission systems.
Figure 6B:
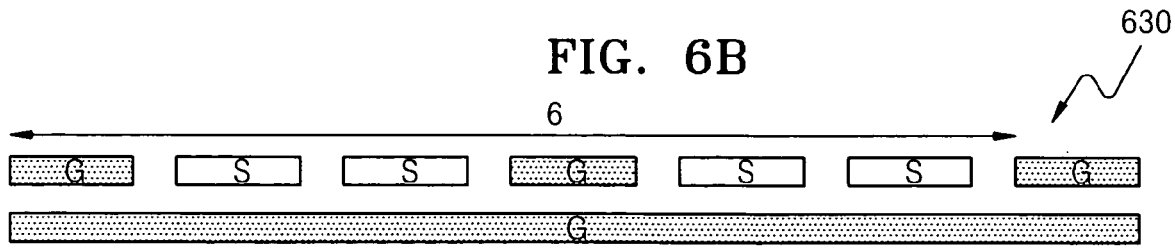
Figure 6C:
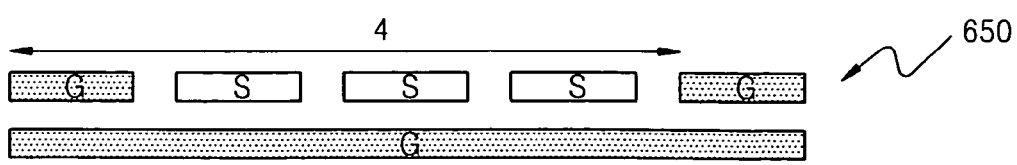

FIGS. 6A-6C illustrate transmission line structures of the single transmission system, differential transmission system and double differential transmission system according to an example embodiment when a guard line is included in the transmission systems. The guard line G may protect transmission lines S. FIG. 6A illustrates the transmission line structure of the single transmission system, FIG. 6B illustrates the transmission line structure of the differential transmission system, and FIG. 6C illustrates the transmission line structure of a double differential transmission system according to an example embodiment.

As shown in FIGS. 6A-6C, to transmit 2-bit data using the transmission line structures including the guard line G, the single transmission system may require four transmission lines and/or the differential transmission system may require six transmission lines. The double differential transmission system of example embodiments may need four transmission lines.

Table 6 represents the number of states of 1-bit data and 2-bit data and the number of transmission lines required when the 1-bit data and 2-bit data may be transmitted in the single transmission system, differential transmission system and double differential transmission system.

TABLE 6

|  | Single transmission | | Differential transmission | | Double differential transmission |
|---|---|---|---|---|---|
| Number of transmission lines | 1 | 2 | 2 | 4 | 3 |
| Number of states | 2 | 4 | 2 | 4 | 4 |
| Number of bits | 1 | 2 | 1 | 2 | 2 |

Referring to Table 6, when the 1-bit data may be transmitted, the number of states may be 2, the single transmission system may require a single transmission line and/or the differential transmission system may require two transmission lines. The double differential transmission system according to example embodiments may require three transmission lines when the 1-bit data is transmitted. Considering a semiconductor device transmitting plural-bit data, comparison of the three transmission systems may be meaningless when the 1-bit data is transmitted.

When the 2-bit data is transmitted, the number states may be 4, the single transmission system may require two transmission lines and/or the differential transmission system may require four transmission lines. The double differential transmission system according example embodiments may use three transmission lines when the 2-bit data may be transmitted. For example, example embodiments may reduce the number of transmission lines for transmitting data while using the differential transmission method efficient for the transmission of higher frequency signals.

Figure 7A:
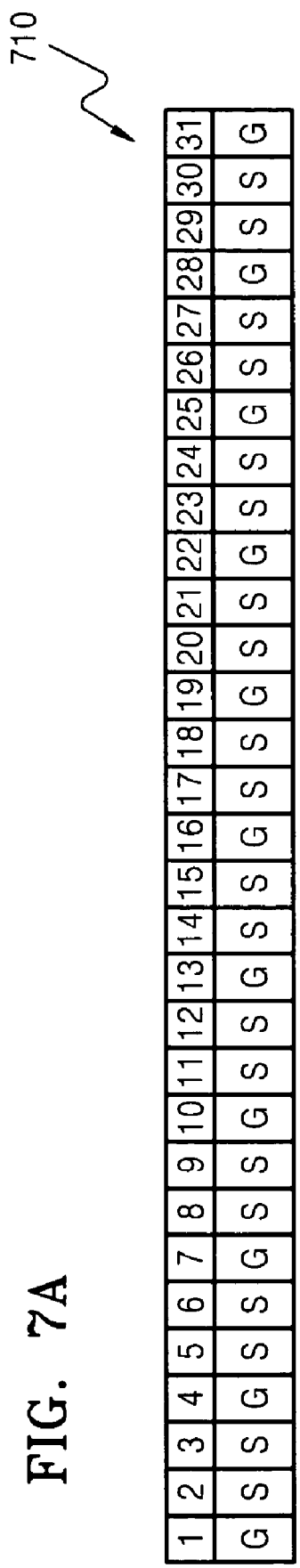
FIGS. 7A and 7B are example diagrams for comparing a transmission method according to an example embodiment to the differential transmission method when 10-bit data may be transmitted.
Figure 7B:
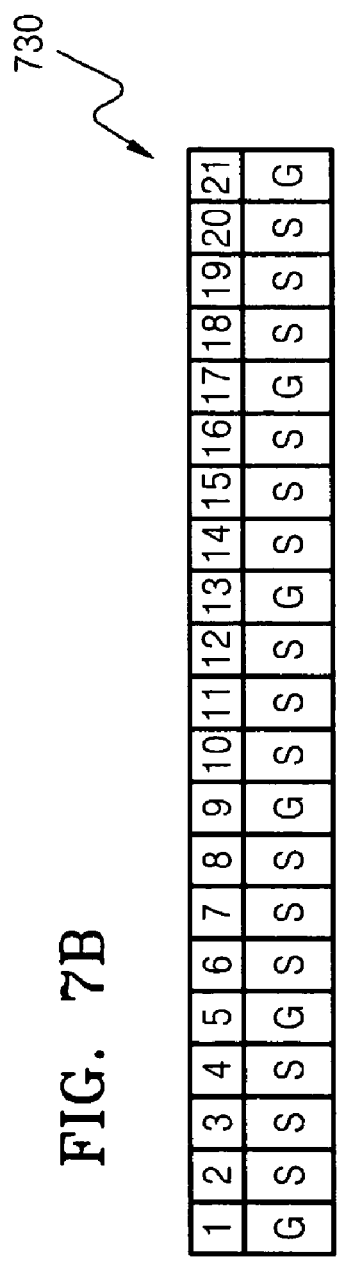

FIGS. 7A-7B are diagrams for comparing the double differential transmission system according to example embodiments to the differential transmission system when 10-bit data may be transmitted. FIG. 7A illustrates a transmission line structure of the differential transmission system and FIG. 7B illustrates a transmission line structure of the double differential transmission system according to an example embodiment. These two transmission line structures may include guard lines G.

As shown in FIGS. 7A and 7B, to transmit the 10-bit data, the differential transmission system may require 31 transmission lines while the double differential transmission system may require 21 transmission lines. For example, the double differential transmission system may reduce the number of transmission lines by 32% compared to the differential transmission system. When data is transmitted in the same circuit area, the amount of data that may be transmitted by the double differential transmission system of example embodiments may be increased 48% compared to the differential transmission system.

As described above, the double differential transmission system according to example embodiments may transmit differential signals using a smaller number of transmission lines. Accordingly, a larger number of signals may be transmitted in the same area.

While example embodiments above may be directed to a transmission line set including first, second, and third transmission lines transmitting 2-bit data, it will be recognized that alternative example embodiments may include a transmission line set with n+1 transmission lines transmitting n bit data.

Although example embodiments have been shown and described in this specification and figures, it would be appreciated by those skilled in the art that changes may be made to the illustrated and/or described example embodiments without departing from their principles and spirit, the scope of which is defined by the claims and their equivalents.

What is claimed is:

1. A transmission system comprising:
   at least one transmission line set each transmitting 2-bit data of a plurality of bits,
      wherein each transmission line set includes first, second and third transmission lines arranged in order, the first, second, and third transmission lines respectively transmitting first, second, and third signals each having one of first, second, and third values such that a combination of a first electric field between the first and second transmission lines and a second electric field between the second and third transmission lines is made depending on a logic state of the 2-bit data.

2. The transmission system of claim 1, wherein the first, second, and third signals are first, second, and third voltage signals each having one of first, second, and third voltages.

3. The transmission system of claim 2, wherein the 2-bit data has first, second, third and fourth logic states,
   wherein the first electric field is in a direction from the first transmission line toward the second transmission line and the second electric field is in a direction from the second transmission line toward the third transmission line in the first logic state,
   wherein the first electric field is in the direction from the first transmission line toward the second transmission line and the second electric field is in a direction from the third transmission line toward the second transmission line in the second logic state,
   wherein the first electric field is in a direction from the second transmission line toward the first transmission line and the second electric field is in the direction from the second transmission line toward the third transmission line in the third logic state, and
   wherein the first electric field is in the direction from the second transmission line toward the first transmission line and the second electric field is in the direction from the third transmission line toward the second transmission line in the fourth logic state.

4. The transmission system of claim 3, wherein the first, second and third voltage signals respectively have the first, second and third voltages in the first logic state,
   wherein the first, second and third voltage signals respectively have the first, third and first voltages in the second logic state,
   wherein the first, second and third voltage signals respectively have the third, first and third voltages in the third logic state, and
   wherein the first, second and third voltage signals respectively have the third, second and first voltages in the fourth logic state.

5. The transmission system of claim 2, further comprising:
   a driver for each transmission line set generating the first, second and third voltage signals in response to the 2-bit data and respectively transmitting the first, second and third voltage signals to the first, second and third transmission lines; and
   a receiver for each transmission line set receiving the first, second and third voltage signals respectively transmitted through the first, second and third transmission lines to generate generated 2-bit data.

6. The transmission system of claim 5, wherein the driver includes
   a first differential amplifier differential-amplifying one bit of the 2-bit data and a reference voltage, and
   a second differential amplifier differential-amplifying another bit of the 2-bit data and the reference voltage,
      wherein the first voltage signal corresponds to a first output of the first differential amplifier,
      wherein a second output of the first differential amplifier and a first output of the second differential amplifier are combined and distributed to a voltage to become the second voltage signal, and
      wherein the third voltage signal corresponds to a second output of the second differential amplifier.

7. The transmission system of claim 5, wherein the receiver includes
   a third differential amplifier receiving the first and second voltage signals and differential-amplifying the received first and second voltage signals, and
   a fourth differential amplifier receiving the second and third voltage signals and differential-amplifying the received second and third voltage signals,
      wherein an input terminal of the third differential amplifier and an input terminal of the fourth differential amplifier, which receive the second voltage signal, are connected to each other, and
   wherein one bit of the generated 2-bit data corresponds to an output of the third differential amplifier and another bit of the generated 2-bit data corresponds to an output of the fourth differential amplifier.

8. The transmission system of claim 5, wherein the receiver includes
   a fifth differential amplifier receiving the first and second voltage signals and differential-amplifying the received first and second voltage signals, a sixth differential amplifier receiving the second and third voltage signals and differential-amplifying the received second and third voltage signals, and a reference voltage setting unit setting a reference voltage to fix the levels of a second output of the fifth differential amplifier and a first output of the sixth differential amplifier to the reference voltage, wherein an input terminal of the fifth differential amplifier and an input terminal of the sixth differential amplifier, which receive the second voltage signal, are connected to each other, and wherein one bit of the generated 2-bit data corresponds to a first output of the fifth differential amplifier and another bit of the generated 2-bit data corresponds to a second output of the sixth differential amplifier.

9. The transmission system of claim 8, wherein the reference voltage setting unit includes a first resistor having a first terminal connected to a first voltage, a second resistor having a first terminal connected to a second terminal of the first resistor and a second terminal connected to a second voltage, a third resistor having a first terminal connected to the second terminal of the first resistor and a second terminal connected to the second output of the fifth differential amplifier, and a fourth resistor having a first terminal connected to the second terminal of the first resistor and a second terminal connected to the first output of the sixth differential amplifier.

10. The transmission system of claim 5, further comprising:

a first inverter for each transmission line set inverting the first, second and third voltage signals generated by the driver and respectively transmitting the inverted first, second and third voltage signals to the first, second and third transmission lines, and a second inverter for each transmission line set receiving the inverted first, second and third voltage signals transmitted through the first, second and third transmission lines, inverting the received inverted first, second and third voltage signals, and outputting the twice inverted first, second and third voltage signals to the receiver.

11. The transmission system of claim 1, wherein the data transmitted through the first, second and third transmission lines is double differential signals.

12. method for transmitting data of a plurality of bits in a transmission system including a transmission line set for each 2-bit data of the plurality of bits, each transmission line set including first, second and third transmission lines arranged in order, comprising:

generating for each transmission line set first, second and third signals each having one of first, second and third values such that a combination of a first electric field between the first and second transmission lines and a second electric field between the second and third transmission lines is made depending on a logic state of the 2-bit data;

respectively transmitting for each transmission line set the first, second and third signals to the first, second and third transmission lines; and receiving for each transmission line set the first, second and third signals transmitted through the first, second and third transmission lines to generate generated 2-bit data.

13. The method of claim 12, wherein the first, second, and third signals are first, second and third voltage signals each having one of first, second and third voltages.

14. The method of claim 13, wherein the 2-bit data has first, second, third and fourth logic states, wherein the first electric field is in a direction from the first transmission line toward the second transmission line and the second electric field is in a direction from the second transmission line toward the third transmission line in the first logic state, wherein the first electric field is in the direction from the first transmission line toward the second transmission line and the second electric field is in a direction from the third transmission line toward the second transmission line in the second logic state, wherein the first electric field is in a direction from the second transmission line toward the first transmission line and the second electric field is in the direction from the second transmission line toward the third transmission line in the third logic state, and wherein the first electric field is in the direction from the second transmission line toward the first transmission line and the second electric field is in the direction from the third transmission line toward the second transmission line in the fourth logic state.

15. The method of claim 14, wherein the first, second and third voltage signals respectively have the first, second and third voltages in the first logic state, wherein the first, second and third voltage signals respectively have the first, third and first voltages in the second logic state, wherein the first, second and third voltage signals respectively have the third, first and third voltages in the third logic state, and wherein the first, second and third voltage signals respectively have the third, second and first voltages in the fourth logic state.

16. The method of claim 13, wherein the transmitting of the first, second and third voltage signals includes inverting the first, second and third voltage signals and respectively transmitting the inverted the first, second and third voltage signals to the first, second and third transmission lines; and receiving the inverted first, second and third voltage signals respectively transmitted through the first, second and third transmission lines, inverting the received inverted first, second and third voltage signals and outputting the twice inverted first, second and third voltage signals.

17. The method of claim 12, wherein the data transmitted through the first, second and third transmission lines is double differential signals.

18. The method of claim 12, wherein the first, second and third signals are first, second and third current signals each having one of first, second, and third current quantities.

19. The transmission system of claim 1, wherein the first, second and third signals are first, second, and third current signals each having one of first, second, and third current quantities.

* * * * *